United States Patent
Gwock (10) Patent No.: US 11,134,124 B2
(45) Date of Patent: Sep. 28, 2021

(54) METHOD AND SYSTEM FOR CONNECTING BETWEEN TERMINALS IN MULTIMEDIA COMMUNICATION

(71) Applicant: LINE Plus Corporation, Seongnam-si (KR)

(72) Inventor: Jungnam Gwock, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 0 days.

(21) Appl. No.: 16/866,920

(22) Filed: May 5, 2020

(65) Prior Publication Data

US 2020/0366740 A1    Nov. 19, 2020

(30) Foreign Application Priority Data

May 16, 2019   (KR) .................. 10-2019-0057616

(51) Int. Cl.
*H04L 29/08*   (2006.01)
*G06F 16/245*   (2019.01)

(52) U.S. Cl.
CPC .......... *H04L 67/141* (2013.01); *G06F 16/245* (2019.01)

(58) Field of Classification Search
CPC ........................ H04L 67/141; G06F 16/245
See application file for complete search history.

(56) References Cited

U.S. PATENT DOCUMENTS 9,172,815 B2 * 10/2015 Turner ............... H04M 3/567
2005/0238156 A1   10/2005 Turner

FOREIGN PATENT DOCUMENTS

| KR | 10-1136712 A | | 4/2012 |
| KR | 20160050563 A | * | 5/2016 |
| KR | 20180074341 A | * | 7/2018 |

OTHER PUBLICATIONS

Indian Office Action dated Jul. 8, 2021 issued in the corresponding Indian Application No. 202024020087.

* cited by examiner

*Primary Examiner* — Benjamin M Thieu
(74) *Attorney, Agent, or Firm* — Harness, Dickey & Pierce, P.L.C.

(57) ABSTRACT

Disclosed is a terminal connection method for multimedia communication. The terminal connection method may reduce or minimize the use of an access network by bridging a connection between access networks of two terminals through an internal application server (iAS).

12 Claims, 11 Drawing Sheets

METHOD AND SYSTEM FOR CONNECTING BETWEEN TERMINALS IN MULTIMEDIA COMMUNICATION

CROSS-REFERENCE TO RELATED APPLICATIONS

This U.S. non-provisional application claims priority under 35 U.S.C. § 119 to Korean Patent Application No. 10-2019-0057616, filed May 16, 2019, the entire contents of which are incorporated herein by reference in their entirety.

BACKGROUND

Field

One or more example embodiments relate to methods, systems, and/or non-transitory computer-readable storage media for connecting terminals for multimedia communication.

Description of Related Art

There are various network transaction techniques for multimedia communication between two terminals. Generally, such network transaction techniques are not fast. In particular, if an access network is slow or unstable, it may give a malicious effect to a service to be provided through multimedia communication between two terminals. For example, a voice over Internet protocol (VoIP) refers to technology for converting voice to a digital packet and transmitting the digital packet through a network using an IP address. Thus, a VoIP service may be affected by a state of an access network through which two terminals communicate with each other.

SUMMARY

Some example embodiments may provide terminal connection methods that may reduce or minimize the use of an access network by bridging a connection between access networks of two terminals through an internal application server, computer apparatuses for performing the method, and/or non-transitory computer-readable storage media storing instructions that, when executed by a processor, cause the processor to perform the methods.

According to an example embodiment, a terminal connection method of an internal application server (iAS) implemented using a computer apparatus comprising at least one processor includes receiving, by the at least one processor, first information about relations between one or more nodes and a plurality of front end servers, the plurality of front end servers including a first front end server and a second front end server, and storing, by the at least one processor, the first information in a database, receiving, by the at least one processor, a message requesting a connection between a first node and a second node of the one or more nodes from an external application server (xAS) desiring to connect the first node and the second node, searching, by the at least one processor, the database for the first front end server having a relation with the first node and the second front end server having a relation with the second node, and transmitting, by the at least one processor, a first request for the connection between the first node and the second node to at least one of the first front end server or the second front end server, the first request requesting bridging between the first front end server and the second front end server.

The method may further include setting up, by the at least one processor, an access session between the first front end server and the second front end server in response to a second request from the first front end server to the second front end server or from the second front end server to the first front end server for access session connection.

The method may further include performing, by the at least one processor, communication between the first node and the second node through the access session set up between the first front end server and the second front end server.

The method further include, in response to a third request from a specific node of the one or more nodes desiring a service to a specific front end server of the plurality of front end servers for access session connection, setting up, by the at least one processor, an access session between the specific node and the specific front end server, and storing, by the at least one processor, second information about a fourth relation between the specific node and the specific front end server.

According to an example embodiment, a terminal connection method of a first front end server implemented using a computer apparatus comprising at least one processor includes receiving by the at least one processor, a first request for access session connection from a first node having a relation with the first front end server, setting up, by the at least one processor, a first access session with the first node in response to the first request for access session connection, transmitting, by the at least one processor, first information about relations between the first front end server and the first node to an internal application server (iAS), receiving, by the at least one processor, a node connection request from the internal application server for connection between the first node and a second node having a second relation with the second front end server of the plurality of front end servers, transmitting, by the at least one processor a second request for access session connection to the second front end server to set up a second access session with the second front end server in response to the received node connection request, and supporting, by the at least one processor, communication between the first node and the second node using the second access session.

According to an example embodiment, there is provided a non-transitory computer-readable storage medium storing instructions that, when executed by a processor, cause the processor to perform the aforementioned method.

According to an example embodiment, a computer apparatus includes at least one processor configured to execute a computer-readable instruction. The at least one processor is configured to receive first information about relations between one or more nodes and a plurality of front end servers and store the first information in a database the plurality of front end servers including a first front end server and a second front end server, receive a message requesting a connection between a first node and a second node of the one or more nodes from an external application server (xAS) desiring to connect the first node and the second node, search the database for the first front end server having a relation with the first node and the second front end server having a relation with the second node, and transmit a first request for the connection between the first node and the second node to at least one of the first front end server and the second front end server, the first request requesting bridging between the first front end server and the second front end server.

According to an example embodiment, a first front end server implemented using a computer apparatus including at least one processor includes at least one processor configured to execute a computer-readable instruction. The at least one processor is configured to receive a first request for access session connection from a first node, set up a first access session with the first node in response to the first request for access session connection, transmit first information about a first relation between the first front end server and the first node to an internal application server (iAS), receive a node connection request from the internal application server for connection between the first node and a second node having a second relation with a second front end server, transmit a second request for access session connection to the second front end server to set up a second access session with the second front end server in response to the received node connection request, and support communication between the first node and the second node using the second access session.

According to some example embodiments, it is possible to reduce or minimize the use of an access network by bridging a connection between access networks of two terminals through an internal application server.

According to some example embodiments, it is possible to improve a connection speed between terminals for multimedia communication by reducing or minimizing the use of an access network.

Further areas of applicability will become apparent from the description provided herein. The description and specific examples in this summary are intended for purposes of illustration only and are not intended to limit the scope of the present disclosure.

DETAILED DESCRIPTION

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the inventive concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

A terminal connection method according to some example embodiments may be performed through at least one computer apparatus. Here, a computer program according to some example embodiments may be installed and executed on the computer apparatus and the computer apparatus may perform the terminal connection method under control of the executed computer program. The computer program may be stored in a non-transitory computer-readable storage medium to implement the terminal connection method on a computer in conjunction with the computer apparatus.

Figure 1:
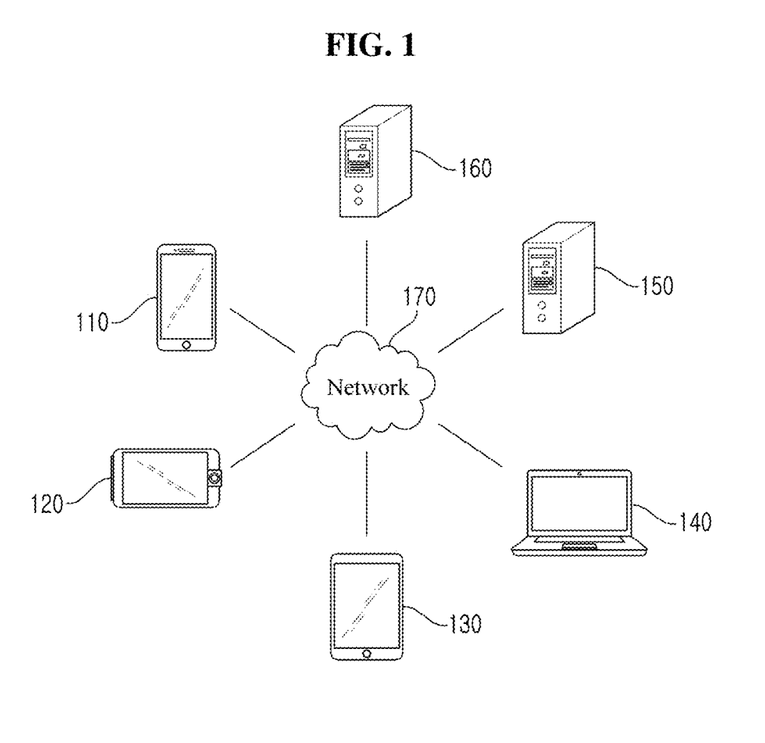
FIG. 1 is a diagram illustrating an example of a network environment according to at least one example embodiment.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as an example of environments applicable to the example embodiments and an environment applicable to the example embodiments is not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service to the plurality of electronic devices 110, 120, 130, and 140 connected over the network 170. The service may include, for example, a messaging service, a mail service, a social network service (SNS), a map service, a translation service, a financial service, a payment service, a search service, a content providing service, and the like.

Figure 2:
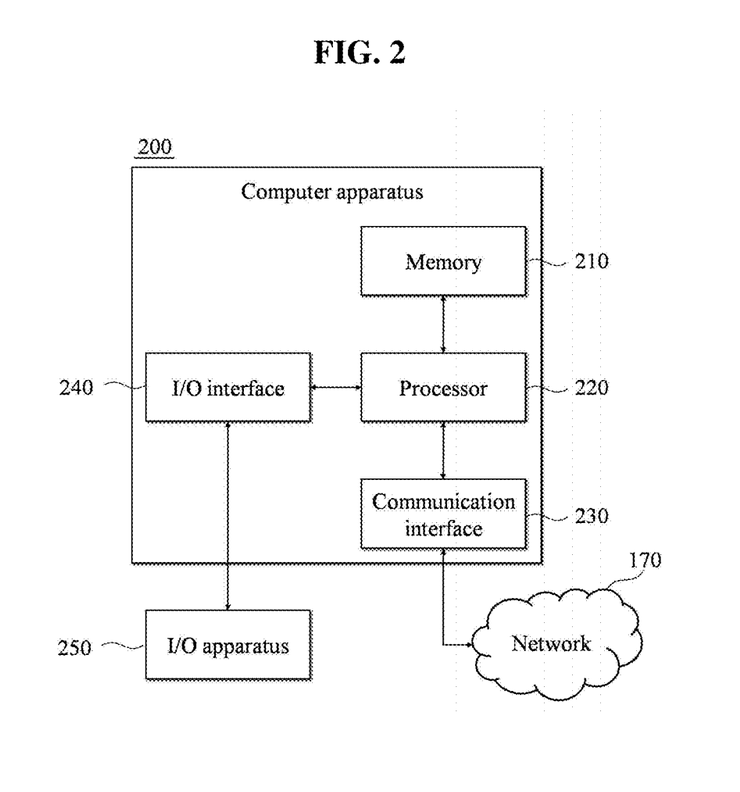
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and 140 or each of the servers 150 and 160 may be configured by a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as random access memory (RAM), a read only memory (ROM), and a disk drive, as a non-transitory computer-readable storage medium. The permanent mass storage device, such as ROM and disk drive, may be included in the computer apparatus 200 as a permanent storage device separate from the memory 210. Also, an OS and at least one program code may be stored in the memory 210. The software components may be loaded to the memory 210 from another non-transitory computer-readable medium separate from the memory 210. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 210 through the communication interface 230 instead of, or in addition to, the non-transitory computer-readable storage medium. For example, software components may be loaded to the memory 210 of the computer apparatus 200 based on a computer program installed by files received over the network 170.

The processor 220 may be configured to process computer-readable instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and another apparatus, for example, the aforementioned storage devices, over the network 170. For example, the processor 220 of the electronic apparatus 200 may transfer data, a file, a request or an instruction created based on the program code stored in the storage device, such as the memory 210, to other apparatuses over the network 170 under control of the communication interface 230. Inversely, a signal, an instruction, data, a file, etc., from the other apparatus may be received at the computer apparatus 200 through the communication module 230 of the computer apparatus 200 by going through the network 170. For example, a signal, an instruction, data, etc., received through the communication interface 230 may be transferred to the processor 220 or the memory 210, and a file, etc., may be stored in a storage medium, for example, the permanent mass storage device, further includable in the computer apparatus 200.

The I/O interface 240 may be a device used for interface with an I/O apparatus 250. For example, an input device may include a device, such as a microphone, a keyboard, a mouse, and the like, and an output device may include a device, such as a display, a speaker, and the like. As another example, the I/O interface 240 may be a device for interface with an apparatus in which an input function and an output function are integrated into a single function, such as a touchscreen. The I/O apparatus 250 may be configured as a single apparatus with the computer apparatus 200.

According to other example embodiments, the computer apparatus 200 may include a number of components greater than or less than a number of components shown in FIG. 2. However, there is no need to clearly illustrate many components according to the related art. For example, the computer apparatus 200 may include at least a portion of the I/O apparatus 250, or may further include other components, for example, a transceiver, a database (DB), and the like.

FIGS. 3 to 9 illustrate examples of a process of providing a connection between terminals according to at least one example embodiment.

Figure 3:
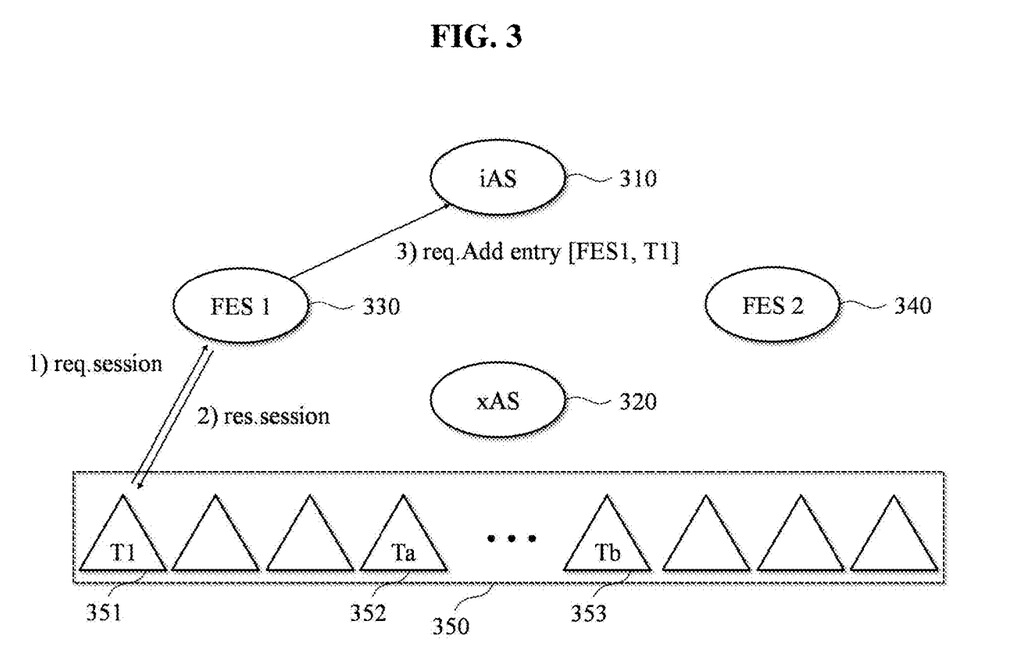
FIGS. 3 to 9 illustrate examples of a process of providing a connection between terminals according to at least one example embodiment.

FIG. 3 illustrates an internal application server (iAS) 310, an external application server (xAS) 320, a front end server 1 (FES 1) 330, a front end server 2 (FES2) 340, and a plurality of terminals 350. Here, the term "front end server" may refer to a physical device that forms a front end of an access network, for example, an access point (AP) of an access network using wireless fidelity (WiFi). As another example, the front end server may be configured in a physical device such as a proxy server or a gateway server.

Here, a session (e.g., a media session) may be pre-set up between each of the terminals 350 and the front end servers, for example, the front end server 1 330 and the front end server 2 340. For example, referring to FIG. 3, in response to 1) a request (req.session) from a terminal (T1) 351 to the front end server 1 330, the front end server 1 330 sets up an access session with the terminal 1 351 and 2) responds (res.session). For example, in the case of a voice over Internet protocol (VoIP) service, setting up an access session may correspond to setting up a real-time transport protocol (RTP) session by transmitting an "INVITE" message of a session initiation protocol (SIP) from the terminal 1 351 to the front end server 1 330 and by receiving a response message of "2000K" from the front end server 1 330 to the terminal 1 351. Here, once the access session is set up, the front end server 1 330 may forward information about a relation between the front end server 1 330 and the terminal 1 351 to the internal application server 310 such that information about the corresponding relation may be stored and managed in the internal application server 310 3) (req.Add entry [FES 1, T1]). For example, the internal application server 310 may store information about the corresponding relation in a mapping table of a database.

Figure 4:
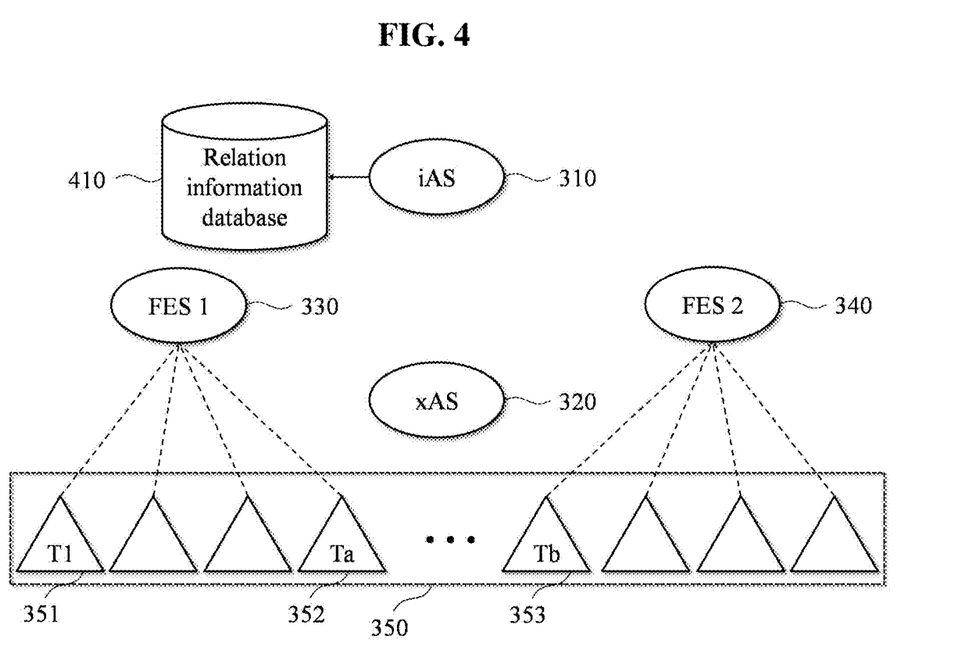

Here, once each of the terminals 350 sets up an access session with the front end server 1 330 and the front end server 2 340 through the above process, the access sessions may be preset up between each of the terminals 350 and the front end server 1 330 and the front end server 2 340, as indicated with dotted lines of FIG. 4. The internal application server 310 may construct a relation information database 410 by gathering information about relations between each of the terminals 350 and the front end serves 1 330 and 2 340.

Figure 5:
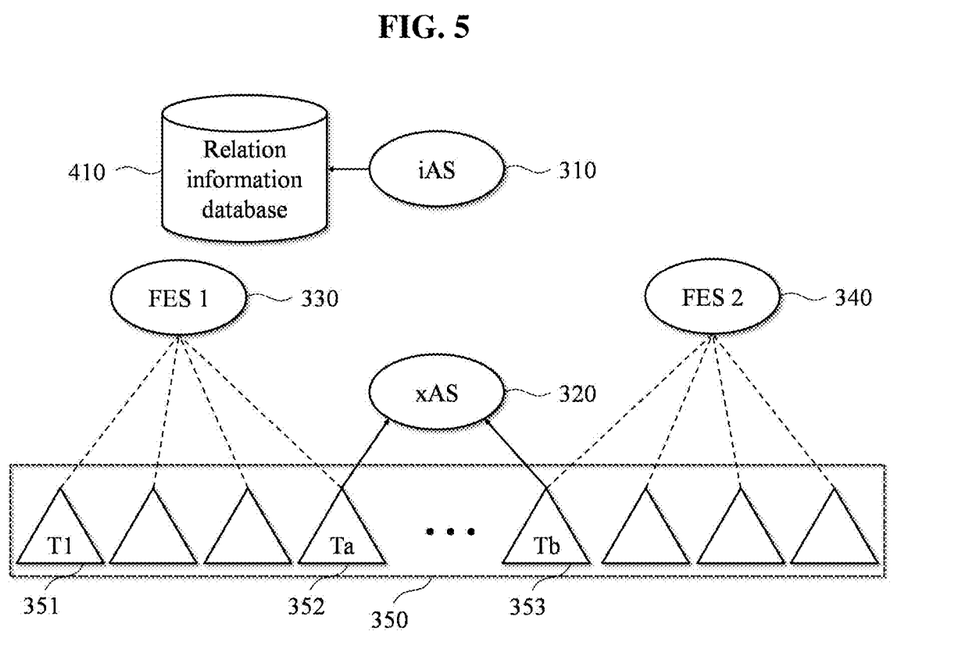

Referring to FIG. 5, it is assumed that a connection between a terminal a (Ta) 352 and a terminal b (Tb) 353 is desired to provide a specific service in the external application server 320 that provides the specific service. For example, the external application server 320 may be a VoIP server that provides a VoIP service between the terminal a 352 and the terminal b 353. In this case, dissimilar to the related art in which an access session is set up between the terminal a 352 and the front end server 1 330 and between the terminal b 353 and the front end server 2 340 per connection for VoIP call, a pre-setup access session may be used herein. That is, it is possible to significantly reduce a number of times the terminals 350 accesses an access network.

Figure 6:
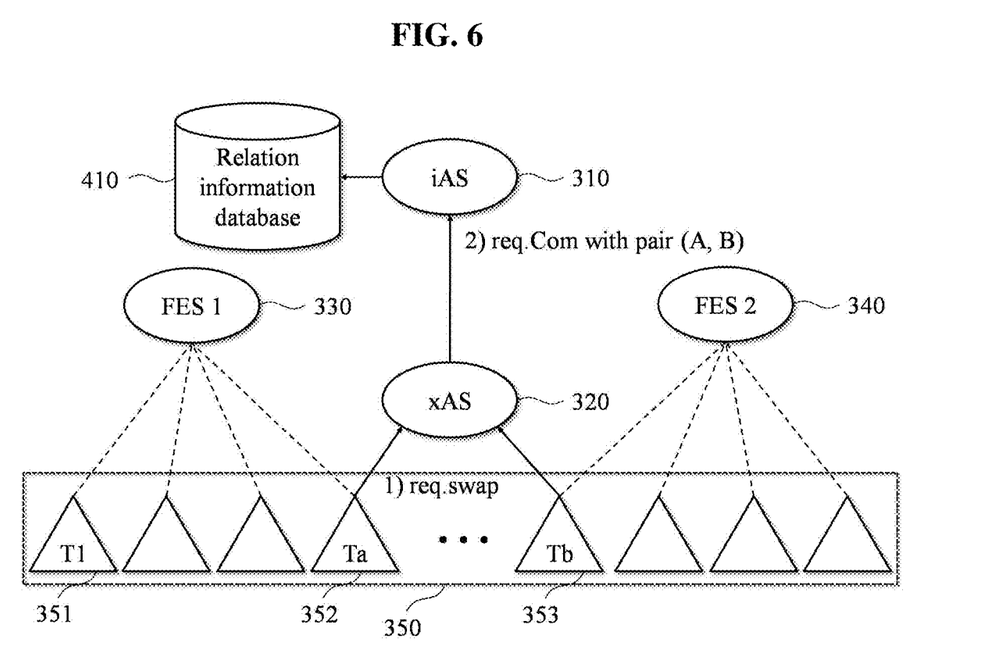
Figure 7:
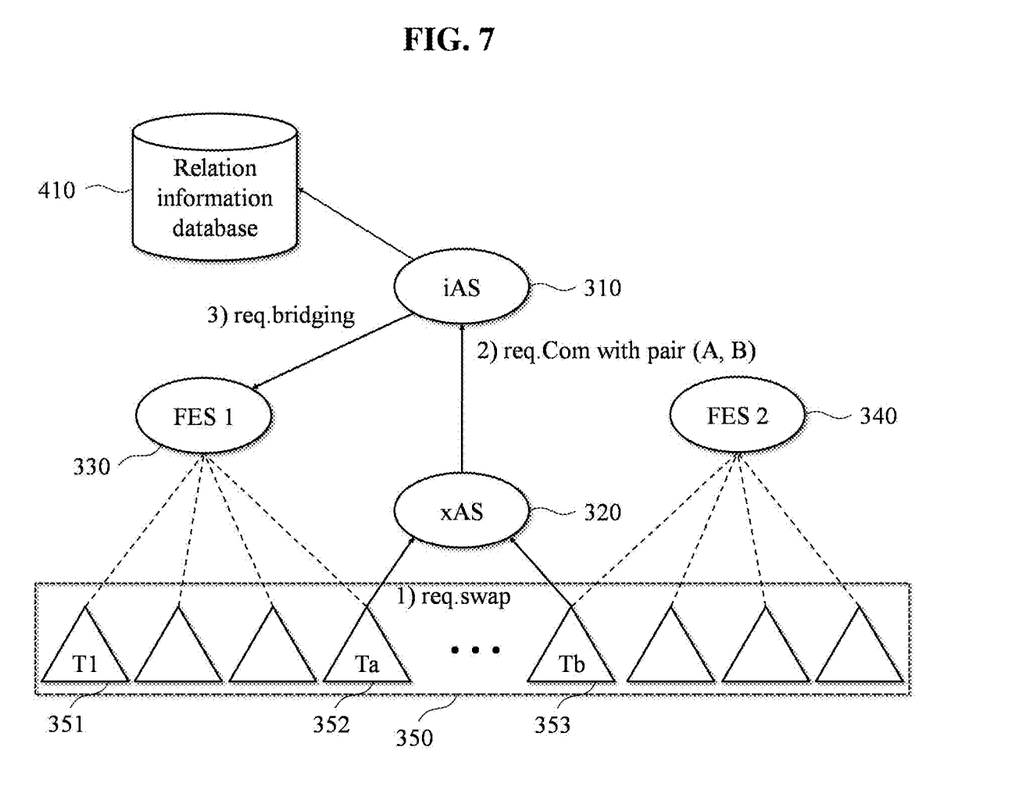

To this end, referring to FIG. 6, in response to 1) a request (req.swap) from the terminal a 352 and/or the terminal b 353, the external application server 320 may transmit information about the terminal a 352 and the terminal b 353 that are to be connected to the internal application server 310 for 2) a request for a connection between the terminal a 352 and the terminal b 353 (req.Com with pair (A, B)). In this case, the internal application server 310 may identify the front end server 1 330 having a relation with the terminal a 352 and the front end server 2 340 having a relation with the terminal b 353 through a relation information database 410.

Here, the internal application server 310 may process bridging between the front end server 1 330 and the front end server 2 340. For example, referring to FIG. 7, the internal application server 310 may transmit, to the front end server 1 330, 3) a bridging request (req.bridging) that includes mapping information between the front end server 2 340 and the terminal b 353.

Figure 8:
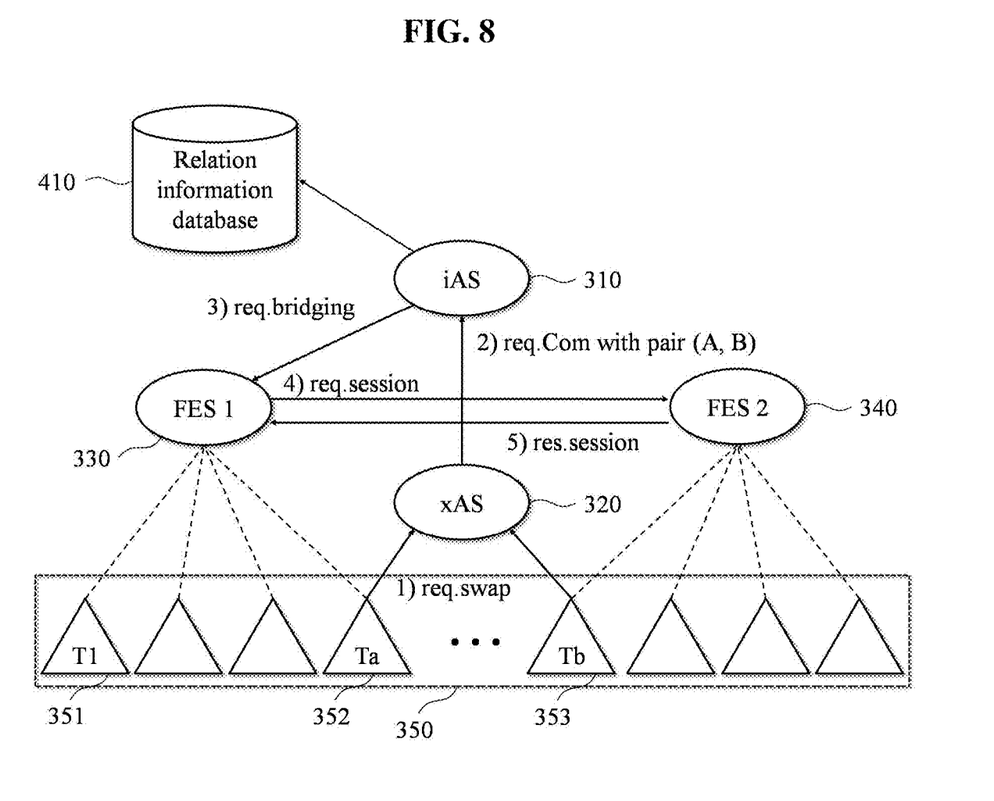

In this case, referring to FIG. 8, in response to 4) a request for an access session (req.session) with the front end server 2 340 from the front end server 1 330, based on information about the front end server 2 340 included in the bridging request, the front end server 2 340 may transmit 5) a response (res.session) to the front end server 1 330 and the access session may be set up between the front end server 1 330 and the front end server 2 340.

Figure 9:
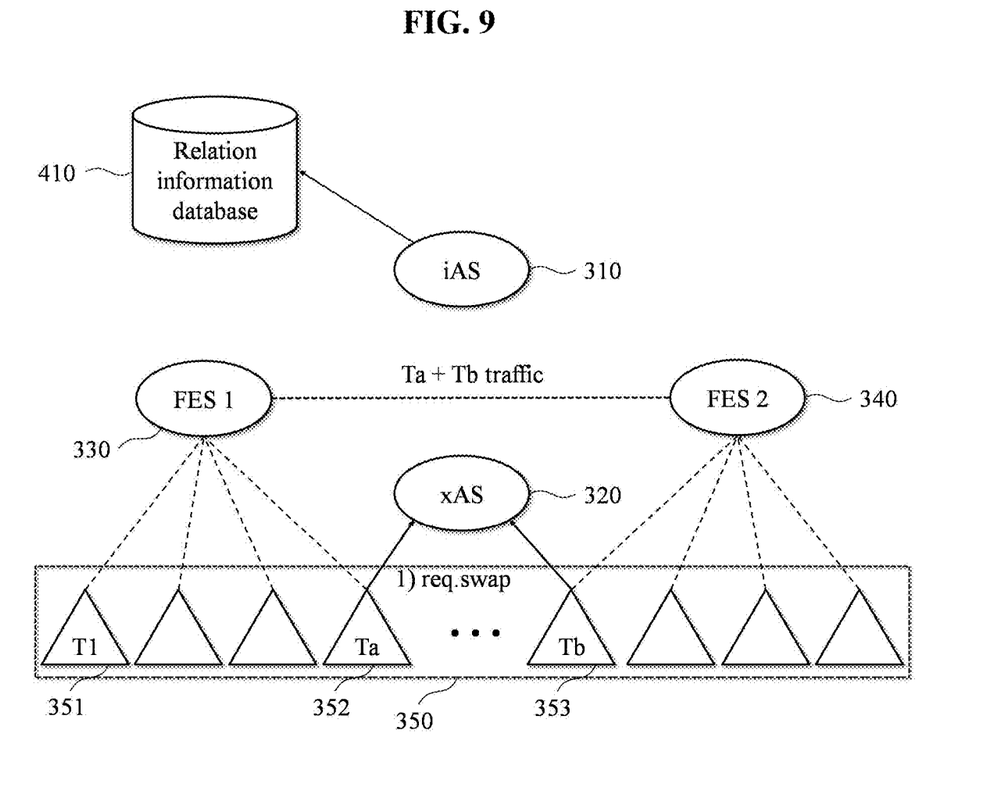

Referring to FIG. 9, once the access session is set up between the front end server 1 330 and the front end server 2 340, communication (e.g., multimedia communication) may be implemented between the terminal a 352 and the terminal b 353 through the access session. That is, for the connection between the terminal a 352 and the terminal b 353, a process of setting up a new access session between the terminal a 352 and the terminal b 353 for each access network may be omitted. Through this, although a communication session between nodes is rapidly set up or a change of a communication session between nodes waiting for communication frequently occurs, communication may be quickly performed without delay.

Figure 10:
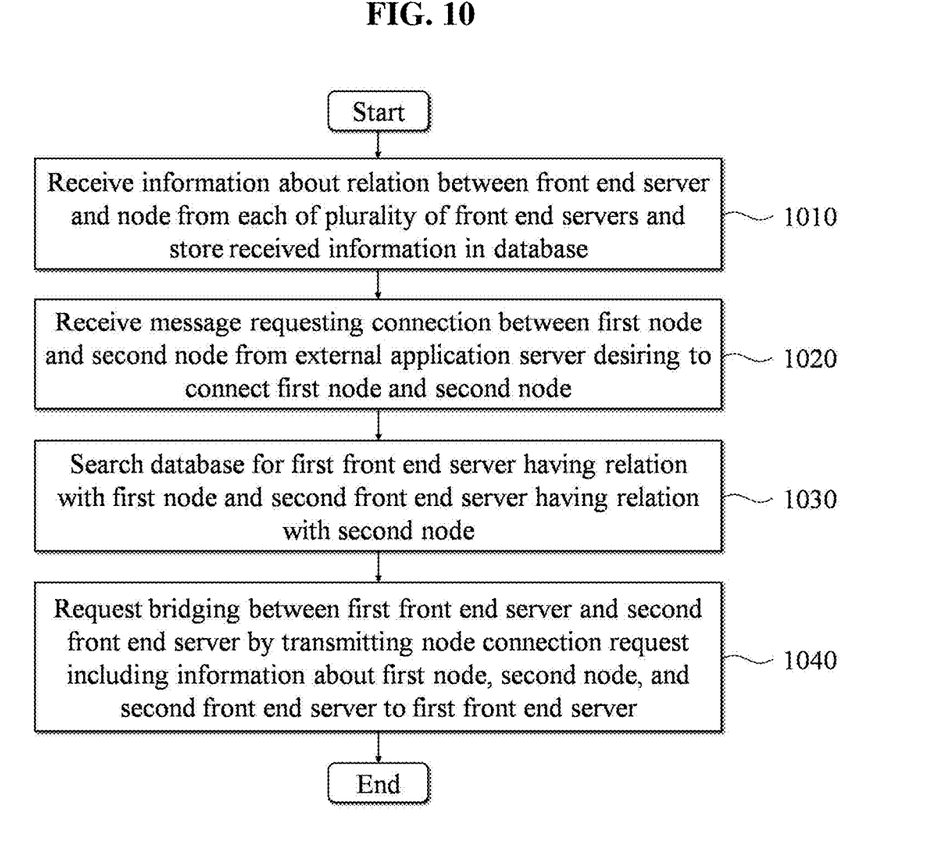
FIG. 10 is a flowchart illustrating an example of a terminal connection method of an internal application server according to at least one example embodiment.

FIG. 10 is a flowchart illustrating an example of a terminal connection method of an internal application server according to at least one example embodiment. The terminal connection method may be performed by the computer apparatus 200 that implements the internal application server 310. For example, the processor 220 of the computer processor 200 may be configured to execute a control instruction according to a code of at least one program or a code of an OS included in the memory 210. Here, the processor 220 may control the computer apparatus 200 to perform operations 1010 to 1040 included in the terminal connection method of FIG. 10 in response to the control instruction provided from the code stored in the computer apparatus 200.

Referring to FIG. 10, in operation 1010, the computer apparatus 200 may receive information about a relation between a front end server and a node from each of a plurality of front end servers and may store the received information in a database. For example, in response to a request from a node desiring a service to a specific front end server for an access session connection, an access session may be set up between the node desiring the service and the specific front end server and a relation may be set between the node desiring the service and the specific front end server. An example in which the internal application server 310 receives and stores information about the relation between the terminal 1 351 as the node and the front end server 1 330 is described above with reference to FIG. 3. Here, the database may correspond to the relation information database 410. Here, the relation between the front end server and the node may correspond to an access session (e.g., a media session) set up between the front end server and the node.

In operation 1020, the computer apparatus 200 may receive a message requesting a connection between a first node and a second node from an external application server desiring to connect the first node and the second node. Here, the external application server may correspond to, for example, the external application server 320, and the first node and the second node may correspond to the terminal a 352 and the terminal b 353, respectively. As described above, the external application server 320 may transmit a request for the connection between the terminal a 352 and the terminal b 353 to the internal application server 310. Herein, the computer apparatus 200 corresponding to the internal application server 310 may receive the message including the request.

In operation 1030, the computer apparatus 200 may search the database for the first front end server having a relation with the first node and the second front end server having a relation with the second node. As described above, since information about relations between front end servers and nodes is stored in the database corresponding to the relation information database 410, the computer apparatus 200 may search the database for front end servers having relations with the first node and the second node to be connected, respectively.

In operation 1040, the computer apparatus 200 may request bridging between the first front end server and the second front end server by transmitting a request for the connection between the first node and the second node to at least one of the first front end server and the second front end server based on a search result. Here, in response to a request from the first front end server (or the second front end server) to the second front end server (or the first front end server) for access session connection, an access session may be set up between the first front end server and the second front end server. The request for access session connection may be transmitted to one of the first front end server or the second front end server. According to some example embodiments, the request for access session connection may be transmitted to each of the first front end server and the second front end server. In this case, communication between the first node and the second node may be performed through the access session set up between the first front end server and the second front end server. That is, nodes may store information about an access session pre-setup with the corresponding front end server in an internal application server, instead of setting up access sessions with an access network per connection with other nodes, and may communicate with each other through the stored information about the access session between the nodes and the front end servers and the access sessions between the front end servers. Therefore, it is possible to reduce or minimize the use of an access network.

Figure 11:
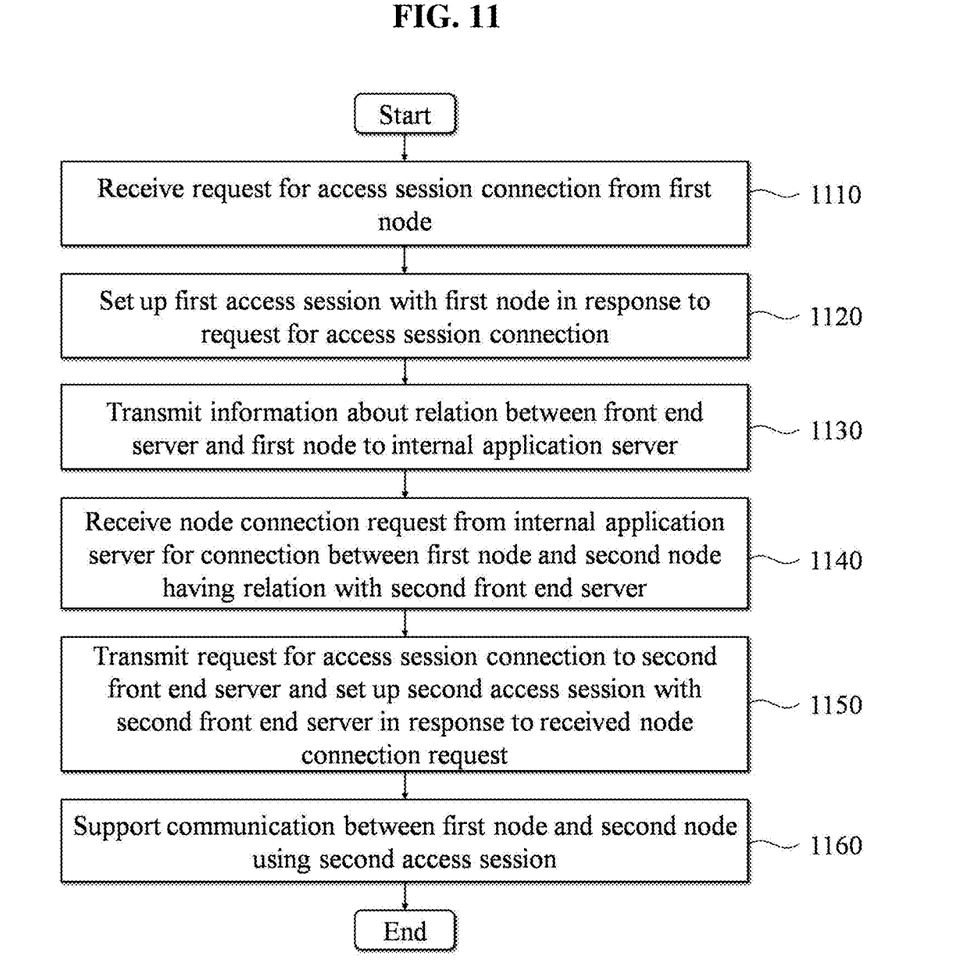
FIG. 11 is a flowchart illustrating an example of a terminal connection method of a front end server according to at least one example embodiment.

FIG. 11 is a flowchart illustrating an example of a terminal connection method of a front end server according to at least one example embodiment. The terminal connection method of FIG. 11 may be performed by the computer apparatus 200 that implements the front end server. Here, the front end server may correspond to, for example, the front end server 1 330 or the front end server 2 340. For example, the processor 220 of the computer apparatus 200 may be configured to execute a control instruction according to a code of at least one program or a code of an OS included in the memory 210. Here, the processor 220 may control the computer apparatus 200 to perform operations 1110 to 1160 included in the terminal connection method of FIG. 11 in response to the control instruction provided from the code stored in the computer apparatus 200.

Referring to FIG. 11, in operation 1110, the computer apparatus 200 may receive a request for access session connection from a first node. The computer apparatus 200 corresponding to a first front end server may receive a request for access session connection corresponding to 1) "req.session" of FIG. 3 from the first node.

In operation 1120, the computer apparatus 200 may set up a first access session with the first node in response to the request for access session connection. The access session between the first front end server and the first node may be set up in response to an initial access from the first node to an access network. Each of nodes may pre-set up an access session with a front end server of an access network that a corresponding node desires to access.

In operation 1130, the computer apparatus 200 may transmit information about a relation between the first front end server and the first node to an internal application server. Here, information about relations between nodes and front end servers may be transmitted to the internal application server, and the internal application server may store and maintain information about the relations. For example, the internal application server may correspond to the aforementioned internal application server 310, and may be configured to store information about relations between the front end servers and the nodes in a database, to receive a message requesting a connection between the first node and the second node from an external application server desiring to connect the first node and the second node, to search the database for the front end server having the relation with the first node and the second front end server having the relation with the second node, and to transmit a request for the connection between the first node and the second node to at least one of the first front end server and the second front end server based on a search result.

In operation 1140, the computer apparatus 200 may receive a node connection request from the internal application server for connection between the first node and the second node having the relation with the second front end server. For example, the computer apparatus 200 receiving the node connection request from the internal application server may verify that the connection between the first node and the second node is desired, based on information about the first node, the second node, and the second front end server included in the node connection request. To this end, the computer apparatus 200 may verify that an access session with the second front end server needs to be set up.

In operation 1150, in response to the received node connection request, the computer apparatus 200 may transmit a request for access session connection to the second front end server, and may set up a second access session with the second front end server. For example, the second front end server receiving the request for access session connection from the computer apparatus 200 may set up an access session with the computer apparatus 200, and may transmit a response to the request for access session connection to the computer apparatus 200.

In operation 1160, the computer apparatus 200 may support communication between the first node and the second n node using the second access session. As described above, the first node and the second node do not have to attempt a connection to the front end server for each connection, and may be interconnected through a pre-setup access session and an access session set up between front end servers.

The external application server may provide various services. For example, in the case of randomly selecting two participants from among participants maintaining a communication session or a caller selecting a specific user that the caller desires to make a call with from a call waiting list, or in the case of ending a call with a first chat counterpart and immediately selecting a second chat counterpart from the call waiting list, a service that provides a seamless and quick connection for video chats between both sides may be considered. For example, a service that provides a video call through a random connection between a plurality of participants may be considered. A first user may desire to change a chat counterpart of a video call through a specific input of a user, such as a swiping or a screen touch, while proceeding with a video call with a second user. In this case, a counterpart change request according to the specific input of the user may be forwarded to the external application server that provides a corresponding service. The external application server may randomly select a third user from a video call waiting list as a target that is to make a video call with the first user. In this case, to connect two terminals of two users, for example, a terminal of the first user and a terminal of the third user in the above example, the external application server may transmit information about the two terminals to the internal application server. As described above, the two terminals may be immediately connected based on information about relations between the front end servers and the terminals stored in the internal application server.

In this service, the external application server may be an application server that each of the terminals can access through an application installed and executed on each corresponding terminal to receive the service. The internal application server may be an internal application server (e.g., a gateway) for interaction with the external application server. For example, when a server that provides a VoIP call service is assumed as the external application server, the external application server may randomly match two users to make a call and the internal application server may trigger an actual VoIP call connection based on a matching result. The internal application server does not include VoIP technology, and thus may enable an actual call connection by controlling the front end servers, which are not VoIP servers, but through an application layer protocol such as HyperText Transfer Protocol (HTTP) in an upper layer that is similar the VoIP server.

As another example of a service provided from the external application server, a service for a quick dispatch in the event of a vehicle accident may be considered. For example, a Blackbox device of a vehicle may be involved in the service as a single node, and may be configured to transmit a captured image to the external application server. Here, a system of each regional accident handling department may be involved in the service as a single terminal (node). Here, if an accident occurs in a corresponding vehicle, a Blackbox device may recognize the accident using, as a signal, a shock against the vehicle or a sudden change in a screen of the vehicle, and may transmit corresponding vehicle information and position information to the external application server (e.g., police station or paramedic). In this case, to attempt a quick connection between the Blackbox device and the system of the accident handling department, the external application server may transmit a communication request with a communication device (node) of the accident handling department present at a position closest to an accident place to the internal application server. The internal application server may search for a front end server that controls a corresponding node, and may quickly connect two nodes through the terminal connection method according to some example embodiments.

Further, the terminal connection methods according to the example embodiments may be used for various services to quickly connect two nodes involved in a service, and thus are capable of reducing or minimizing the use of an access network.

According to the example embodiments, it is possible to reduce or minimize the use of an access network by bridging a connection between access networks of two terminals through an internal application server. Further, it is possible to improve a connection speed between terminals for multimedia communication by reducing or minimizing the access of an access network.

The systems or apparatuses described above may be implemented using hardware components or a combination hardware components and software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed by Appstore that distributes applications or a site, a server, and the like that supplies and distributes other various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A terminal connection method of an internal application server (iAS) implemented using a computer apparatus comprising at least one processor, the method comprising:
   receiving, by the at least one processor, first information about relations between one or more nodes and a plurality of front end servers, the plurality of front end servers including a first front end server and a second front end server, and storing, by the at least one processor, the first information in a database;
   receiving, by the at least one processor, a message requesting a connection between a first node and a second node of the one or more nodes from an external application server (xAS) desiring to connect the first node and the second node;
   searching, by the at least one processor, the database for the first front end server having a relation with the first node and the second front end server having a relation with the second node; and
   transmitting, by the at least one processor, a first request for the connection between the first node and the second node to at least one of the first front end server and the second front end server, the first request requesting bridging between the first front end server and the second front end server.

2. The method of claim 1, further comprising:
   setting up, by the at least one processor, an access session between the first front end server and the second front end server in response to a second request from the first front end server to the second front end server or from the second front end server to the first front end server for access session connection.

3. The method of claim 2, further comprising:
   performing, by the at least one processor, communication between the first node and the second node through the access session set up between the first front end server and the second front end server.

4. The method of claim 1, further comprising:
   in response to a third request from a specific node of the one or more nodes desiring a service to a specific front end server of the plurality of front end servers for access session connection,
       setting up, by the at least one processor, an access session between the specific node and the specific front end server, and
       storing, by the at least one processor, second information about a relation between the specific node and the specific front end server.

5. A terminal connection method of a first front end server implemented using a computer apparatus comprising at least one processor, the method comprising:
   receiving by the at least one processor, a first request for access session connection from a first node having a relation with the first front end server;
   setting up, by the at least one processor, a first access session with the first node in response to the first request for access session connection;
   transmitting, by the at least one processor, first information about a relation between the first front end server and the first node to an internal application server (iAS);
   receiving, by the at least one processor, a node connection request from the internal application server for connection between the first node and a second node having a relation with a second front end server;
   transmitting, by the at least one processor, a second request for access session connection to the second front end server to set up a second access session with the second front end server in response to the received node connection request; and
   supporting, by the at least one processor, communication between the first node and the second node using the second access session.

6. The method of claim 5, further comprising:
   receiving, by the at least one processor, a third request for connections between the first node and the second node to at least one of the first front end server or the second front end server based on a search result of searching a database in response to a message requesting a connection between the first node and the second node from an external application server (xAS) desiring to connect the first node and the second node, the database associated with the internal application server and configured to store the first information.

7. The method of claim 5, further comprising:
   connecting, by the at least one processor, a third access session with a third front end server in response to receiving a request from the third front end server having a relation with a third node for access session connection; and
   supporting, by the at least one processor, communication between the first node and the third node using the third access session.

8. A non-transitory computer-readable storage medium storing instructions that, when executed by at least one processor, cause the at least one processor to perform the method of claim 1.

9. A computer apparatus comprising:
   at least one processor configured to execute a computer-readable instruction,
   wherein the at least one processor is configured to,
       receive first information about relations between one or more nodes and a plurality of front end servers and store the first information in a database, the plurality of front end servers including a first front end server and a second front end server,
       receive a message requesting a connection between a first node and a second node of the one or more nodes from an external application server (xAS) desiring to connect the first node and the second node,
       search the database for the first front end server having a relation with the first node and the second front end server having a relation with the second node, and
       transmit a first request for the connection between the first node and the second node to at least one of the first front end server and the second front end server, the first request requesting bridging between the first front end server and the second front end server.

10. The computer apparatus of claim 9, wherein the at least one processor is configured to set up an access session between the first front end server and the second front end server in response to a second request from the first front end server to the second front end server or from the second front end server to the first front end server for access session connection.

11. A first front end server implemented using a computer apparatus comprising at least one processor, the first front end server comprising:
   the at least one processor configured to execute a computer-readable instruction,
   wherein the at least one processor is configured to,
      receive a first request for access session connection from a first node,
      set up a first access session with the first node in response to the first request for access session connection,
      transmit first information about a relation between the first front end server and the first node to an internal application server (iAS),
      receive a node connection request from the internal application server for connection between the first node and a second node having a relation with a second front end server,
      transmit a second request for access session connection to the second front end server to set up a second access session with the second front end server in response to the received node connection request, and
      support communication between the first node and the second node using the second access session.

12. The first front end server of claim 11, wherein the at least one processor is further configured to receive a third request for connections between the first node and the second node to at least one of the first front end server or the second front end server based on a search result of searching a database in response to a message requesting a connection between the first node and the second node from an external application server (xAS) desiring to connect the first node and the second node, the database associated with the internal application server and configured to store the first information.

* * * * *